United States Patent [19]

Rich

[11] Patent Number: 4,480,508
[45] Date of Patent: Nov. 6, 1984

[54] WIRE STRIPPER HAVING ROTARY DRIVING MEANS

[75] Inventor: Donald S. Rich, Long Valley, N.J.

[73] Assignee: Thomas & Betts Corporation, Raritan, N.J.

[21] Appl. No.: 369,113

[22] Filed: Apr. 16, 1982

[51] Int. Cl.³ .............................................. H02G 1/12
[52] U.S. Cl. ................................................. 81/9.5 R
[58] Field of Search ............... 8/9.5 R, 9.5 A, 9.51; 30/90.1, 90.5

[56] References Cited

U.S. PATENT DOCUMENTS

| | | | |
|---|---|---|---|
| 698,567 | 4/1902 | Sibley . | |
| 1,941,364 | 12/1933 | Nunninghoff | 164/36 |
| 2,306,403 | 12/1942 | Mortensen | 81/9.5 |
| 3,916,733 | 11/1975 | Meadows | 81/9.51 |
| 4,067,250 | 1/1978 | Owen, Jr. et al. | 81/9.51 |
| 4,203,333 | 5/1980 | Campari | 81/9.5 |
| 4,275,630 | 6/1981 | Goldsmith et al. | 83/500 |
| 4,276,798 | 7/1981 | Gottschalk | 83/430 |

FOREIGN PATENT DOCUMENTS

| | | | |
|---|---|---|---|
| 2306031 | 8/1974 | Fed. Rep. of Germany | 81/9.5 R |
| 2373131 | 6/1978 | France . | |
| 2471684 | 6/1981 | France | 81/9.5 R |
| 1241981 | 8/1971 | United Kingdom . | |

Primary Examiner—James G. Smith
Attorney, Agent, or Firm—Robert M. Rodrick; Salvatore J. Abbruzzese

[57] ABSTRACT

An apparatus for removing insulation from an insulated, flat multiconductor cable comprises a body having a channel therein for lateral receipt of the cable. The apparatus includes blades for slicing the cable insulation during insertion into the channel. A rotary driving mechanism is provided for drawing the cable through the channel away from the cutter to thereby remove the sliced insulation. The apparatus includes means associated with the driving mechanism to enable lateral cable insertion into the driving mechanism in non-interfering relation while simultaneously inserting the cable into the cutter.

19 Claims, 8 Drawing Figures

FIG. 1
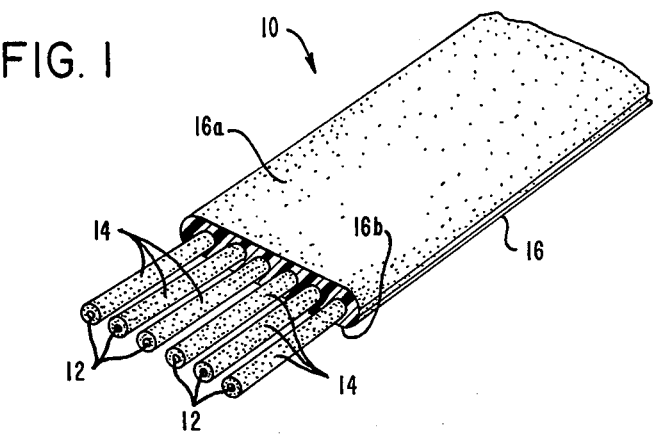
FIG. 2
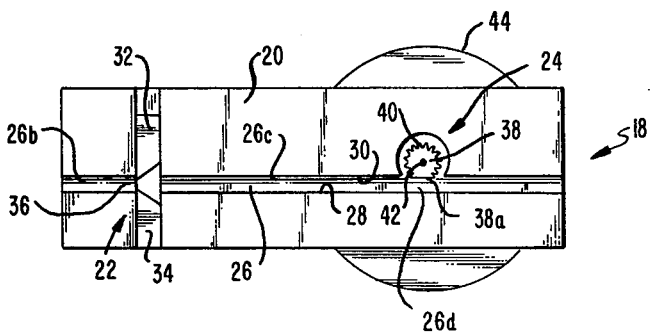
FIG. 3

WIRE STRIPPER HAVING ROTARY DRIVING MEANS

FIELD OF THE INVENTION

This invention relates to an apparatus for removing insulation from an insulated cable, in particular, a flat multiconductor cable having a plurality of individually insulated conductors.

BACKGROUND OF THE INVENTION

In the telephone, communications and data transmission industries, increasing use is being made of flat multiconductor cable of the type including a planar array of individually insulated conductors surrounded by a sheath or jacket of insulative material. In addition, there is more use, for example, in the telephone industry of modular plug type connectors. Such modular connectors are mounted on floor terminals which in turn are desirably electrically connected by the flat multiconductor cable to a wall terminal block, the flat cable extending unobtrusively beneath floor carpeting.

Because of the modern office requirements for office layout flexibility, field installation of telephone terminals and associated cable connections is necessary. In connecting an end of the cable to ancillary electrical terminals, couplings or the like, the cable end is to be stripped of its outer insulative sheath with the insulation of the individual conductors remaining intact. In field applications, where sophisticated wire stripping devices are often not readily available and are relatively costly, resort has been had to a variety of manual stripping tools. These conventional stripping devices have a tendency in pulling off the outer sheath to also pull off some or all of the insulation of the individual conductors. Accordingly, it is desirable to remove the outer insulative shield without damaging the individual conductor insulation with a device that has particular use in field installations.

SUMMARY OF THE INVENTION

It is an object of the present invention to provide an improved apparatus for removing insulation from an insulated cable, such apparatus being particularly suited for removing insulation from an insulated flat, multiconductor cable.

In accordance with the invention, insulation removing apparatus comprises a housing supporting cutting means wherein the cutting means includes insulation cutting surfaces defining an opening for receipt therein of an insulated cable along a predetermined direction. The housing further supports rotary drive means in spaced disposition relative to the cutting means. The rotary drive means is adapted to engage a portion of the insulated cable and pull such cable portion away from the cutting means during rotation of the driving means. The apparatus includes means providing for substantially non-interfering insertion of the cable into the rotary drive means along a direction common to the direction of cable insertion into the opening of the cutting surfaces.

According to a preferred form of the invention, the housing is a body having an elongate, open channel for receipt laterally therein of a flat multiconductor cable. The channel has two opposed wall surfaces spaced apart a distance to be closely adjacent the outer flat cable insulation surfaces. In this preferred arrangement, means are provided for establishing at the rotary drive means an access opening of measure not less than the approximate spacing of the channel wall surfaces, whereby the cable may be inserted laterally into the channel in interfering relation with the cutting means and in substantially non-interfering relation with the rotary drive means.

BRIEF DESCRIPTION OF THE DRAWING

FIG. 1 is a perspective view of an insulated, flat multiconductor cable, showing a portion of its outer sheath removed exposing a plurality of individually insulated conductors.

FIG. 2 is a top plan view of a wire stripping apparatus according to the invention, partly broken away to reveal internal detail.

FIGS. 3 and 4 are front and left side elevational views, respectively, of the wire stripping apparatus of FIG. 2.

DETAILED DESCRIPTION OF THE PREFERRED EMBODIMENTS

Figure 4:
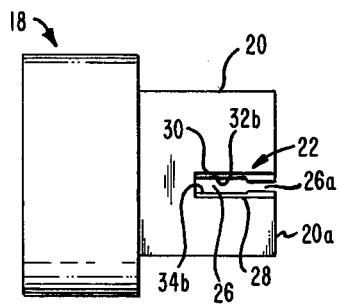
Figure 5:
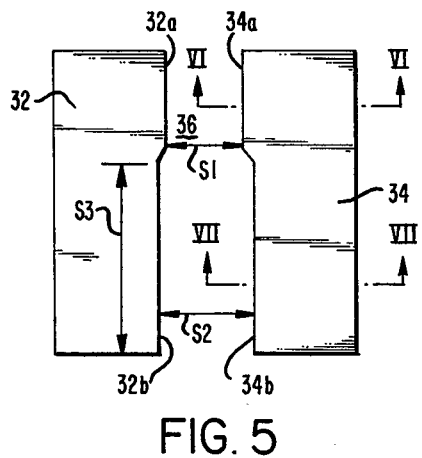
FIG. 5 is an enlarged view of the cutting blade members as would be seen along a section line V—V of FIG. 2, with the background components of the wire stripping apparatus excluded for clarity.

Referring now to the drawing, there is shown in FIG. 1 a conventional flat multiconductor cable 10 of the type that the stripping device of the present invention is particularly suited to accommodate, the cable 10 being shown in its treated condition. The cable 10 comprises a plurality of elongate conductors 12 extending in a substantially planar array, each conductor 12 being individually surrounded by a suitable layer of insulation 14. The insulated conductors 12 are fully surrounded by an outer sheath or jacket 16 of insulation, the jacketed cable 10 having two opposing substantially flat insulation surfaces 16a and 16b, respectively. The sheath 16 may be of the type comprising amounts of carbon or other suitably conductive elements to thereby provide a cable useful in telephone or other communications applications. It should be understood that the cable 10 is described herein for illustrative purposes and that cables of other construction may have insulation removed therefrom in accordance with the principles of the invention as described hereinbelow.

Turning now to FIGS. 2, 3 and 4, an insulation stripping device 18 is shown, the stripping device 18 in its preferred arrangement being of the manually operable type and of size to be held in the palm of an operator's hand. The device 18 comprises a body 20 that houses a cable insulation cutter 22 and a rotary driving mechanism 24. The body 20 is an elongate block-type member, generally rectangular in cross-section and is formed of a suitably rigid material, which may be a plastic or metal. Other body configurations and shapes may also be used. An elongate channel 26 is formed to extend within the body 20 throughout its length and preferably extends into the body 20 a portion of its depth. The channel 26 is formed to have an opening 26a that extends through an outer wall 20a of the body 20 and to have two opposing, substantially parallel, wall surfaces 28 and 30. The channel width, i.e., the spacing between the wall surfaces 28 and 30, is formed to be slightly greater than the thickness of the flat cable 10, i.e., across its two flat surfaces 16a and 16b. Accordingly, with a close clearance between the channel walls and the cable, the channel 26 upon receiving the cable therein serves as a cable guide to maintain the cable in a suitable position for stripping as will be detailed. The channel 26 and thereby the cable guide is provided to precede and succeed the insulation cutter 22 as at 26b and 26c, respectively, channel portion 26c extending between the cutter 22 and the rotary driving mechanism 24.

Figure 6:
FIGS. 6 and 7 are sectional views, respectively, as seen along the section lines VI—VI and VII—VII of FIG. 5.

Referring now to FIGS. 4, 5, 6 and 7, the details of the insulation cutter may be more fully understood. The cutter 22 preferably comprises a pair of spaced blade members 32 and 34, formed preferably of a hardened steel or other suitable material. The blade members are suitably mounted into the body 20 as, for example, by press fitting, and in communication with the channel 26. The blade members each have cutting surfaces 32a and 34a and stepped-down surfaces 32b and 34b, respectively. The opposing cutting surfaces 32a and 34a are relatively sharp, as indicated in FIG. 6, and are disposed in the body 20 to present an opening 36 in interference relation to the cable 10 when received in the channel 26. The spacing $S_1$ between the cutting surfaces 32a and 34a is arranged to be less than the thickness of the cable 10 but greater than the outer diameter of the insulation 14 on the individual conductors. Accordingly, when the cable 10 is laterally inserted into the channel, the sharp cutting surfaces 32a and 34a will slice the outer sheath 16, but will not cut the conductor insulation 14.

Figure 7:
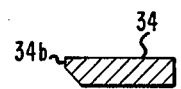

The stepped-down surfaces 32b and 34b are flattened slightly to provide relatively blunt surfaces as shown in FIG. 7. The spacing $S_2$ between the opposing blunt surfaces 32b and 34b accordingly is greater than the spacing $S_1$ and in the preferred form spacing $S_2$ is less than the thickness of the cable 10. Also in the preferred arrangement, the spacing $S_2$ is provided between the blade members 32 and 34 along a length $S_3$ that is greater than the width or lateral extent of the cable 10. The blunt edges 32b and 34b are provided as a means for preventing inadvertent nicking of the cable 10 as it is drawn through the channel during the stripping operation as will be described. It should be appreciated that while the blade members have been described herein as a pair of separate members a single integral cutter with a suitable slot or the like may also be used in the practice of the invention.

Referring again to FIGS. 2 and 3, the details of the rotary driving mechanism 24 are illustrated. The rotary driving mechanism 24 comprises a generally cylindrical driving wheel 38 having a flat portion 38a extending axially along the wheel 38 and defining a geometric chord intersecting the wheel circumference. Around the circumference of the wheel 38, except at the flat portion 38a there are a plurality of radially projecting teeth 40 which extend axially along the wheel 38, the teeth 40 preferably formed in ratchet-like configuration. The wheel 38 is supported by the body at a fixed location spaced longitudinally from the cutter 22 and is adapted to communicate with the channel 26 and to rotate about an axis 42, such axis 42 being offset relative to the channel 26. The axis 42 is offset at a predetermined distance from and extends transversely to the channel 26 such that upon rotation of the driving wheel 38 the teeth 40 are periodically moved into the channel 26 at a position between the channel wall surfaces 28 and 30. Such movement into the channel enables the teeth to engage a cable within the channel and, in cooperation with channel wall surface 28, to draw such cable therethrough. Also, upon rotation of the driving wheel 38, the flat portion 38a is periodically aligned substantially coplanarly with the channel wall surface 30, this position being as shown in FIG. 3. In this position, the flat portion 38a establishes at the driving mechanism 24 a cable access opening 26d of measure approximately the same as the channel spacing, i.e., the distance between wall surfaces 28 and 30. It should be appreciated that the driving wheel 38 offset or the flat portion 38a may be formed to provide an opening 26d that is greater than the channel spacing but not less than the approximate channel spacing so that cable may be inserted into the channel 26 at the rotary driving mechanism in substantially non-interfering relation.

The driving wheel 38 is manually rotatable in accordance with the preferred embodiment by a knob 44 suitably fixedly coupled to the driving wheel 38 by a shaft 46. The driving wheel 38 may be arranged to be movably retained in the position shown in FIG. 3 so as to facilitate cable loading by a suitable detent. Such detent may be in the form of a spring loaded, ball detent set screw 48 threadably supported by the body 20 and adapted to periodically engage a flat portion on the shaft 46.

Figure 8:
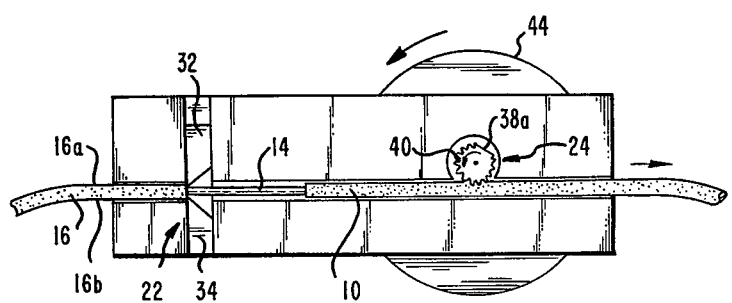
FIG. 8 is a view of the apparatus of FIG. 3, showing the apparatus operating on a flat multiconductor cable to remove a portion of the outer insulative sheath therefrom.

Having described the details of the insulation stripping device 10, the operation thereof may now be understood with reference to the drawing figures, particularly FIG. 8. The device 10 is initially manipulated such that the flat portion 38a of the driving wheel 38 coincides coplanarly with the channel wall 30. A cable, such as the cable of FIG. 1 but unprepared, is inserted laterally into the channel 26 whereby during such insertion one portion of the cable is engaged by the insulation cutter 22 while another portion of the cable is simultaneously moved into the rotary driving mechanism in non-interfering relation. Continued insertion causes the cutting surfaces 32a and 34a to slice the cable insulation across the cable width along cable insulation surfaces 16a and 16b, respectively. Further lateral insertion moves the cable past the cutting surfaces 32a and 34a and into engagement with the blunt edges 32b and 34b. As the spacing $S_2$ between the blunt edges 32b and 34b is less than the cable thickness, the cable insulation cannot pass through the cutter 22 in a rightward direction in FIG. 8. The knob 44 and thereby the driving wheel 38 are turned in a counter-clockwise rotation as indicated in FIG. 8 thereby moving the driving wheel out of the detent and causing the teeth 40 to engage and grasp the cable 10 within the channel 26. Continued rotation of the knob 44 causes longitudinal movement of the cable 10, whereby the cable 10 inclusive of the insulated conductors 12 is drawn within the channel and the insulation remnant 16 is restrained from movement by the cutter 22 and is thereby stripped from the cable as the cable is drawn longitudinally away from the cutter 22. The cable guides provided by the channel portions 26b and 26c, both fore and aft of the cutter, serve to maintain the cable substantially centralized and stable during cable movement thereby minimizing damage to the conductor insulation during stripping. The rotary driving wheel provides a leveraged advance of the cable during the drawing operation whereby substantially uniform force is applied to the cable across its width.

Having described the insulation stripping device of the present invention herein, it should be appreciated that other variations thereof may be employed during the practice thereof. For example, while simplicity and cost advantages attend the rotary driving wheel with a flattened portion, the driving mechanism may be provided with one or more rotatable members for drawing the cable wherein movement may be imparted through spring biasing or the like to such wheels so as to allow clearance for lateral cable insertion. Also, while the insulation stripping device has been described herein as manually operable, it should be appreciated that the device may be modified to function automatically within the contemplation of the invention.

The particularly disclosed and depicted embodiments of the invention and methods are thus intended in an illustrative and not in a limiting sense. The true spirit and scope of the invention are set forth in the following claims.

I claim:
1. An apparatus for removing insulation from an insulated cable comprising:
   a housing;
   cutting means supported by said housing and including spaced insulation cutting surfaces defining an opening for receipt therein of said cable along a predetermined direction;
   rotary drive means including a rotatable, generally cyclindrical driving wheel supported by said housing and spaced from said cutting means, said driving wheel adapted to engage a portion of said cable and pull said cable portion away from said cutting means during rotation thereof;
   said housing having an elongate cable receiving channel communicating with said cutting means and with said driving wheel, said channel including opposing wall surfaces spaced apart a distance to accommodate said cable with relatively close clearance, said driving wheel being rotatable about an axis disposed transversely to said channel and offset relative thereto; and
   means inclusive of a flat portion on said driving wheel extending axially therealong providing for substantially non-interfering insertion of said cable into said rotary drive means simultaneously with insertion of said cable into said cutting means along a direction common to the direction of cable insertion into said opening of said cutting surfaces, said flat portion being, upon rotation of said driving wheel, periodically aligned substantially coplanarly with one of said wall surfaces of said channel.

2. An apparatus according to claim 1, further including cable guide means adjacent said cutting means.

3. An apparatus according to claim 2, wherein said cable guide means extends between said cutting means and said rotary drive means.

4. An apparatus according to claim 1, wherein said cutting means comprises a pair of blade members inclusive of said cutting surfaces and wherein said cutting surfaces are disposed in facing relation defining said opening of dimension less than the outer dimension of said cable insulation.

5. An apparatus according to claim 4, wherein portions of said blade members define a further opening therebetween of dimension greater than said first-mentioned opening.

6. An apparatus according to claim 5, wherein said cutting surfaces include relatively sharp edges.

7. An apparatus according to claim 6, wherein the blade members portions defining said further opening include relatively blunt edges.

8. An apparatus according to claim 1, wherein said driving wheel includes a plurality of radially projecting teeth about its periphery, said teeth adapted to enter into said channel and extend into the spacing between the opposed wall surfaces of said channel upon rotation of said driving wheel.

9. An apparatus according to claim 1, further including detent means supported by said housing for movably retaining said flat portion of said driving wheel in position substantially coplanarly with said channel wall surface.

10. An apparatus according to claim 1, wherein said channel defines cable guide means preceding and succeeding said cutting means.

11. An apparatus for removing insulation from an insulated flat multiconductor cable comprising:
   a body having therein an elongate, open channel for receipt laterally of said flat cable, said channel having two opposed wall surfaces spaced apart a distance to be closely adjacent opposed outer flat surfaces of said cable insulation;
   cutting means communicating with said channel for cutting said cable insulation laterally upon insertion thereof into said channel, said cutting means including at least one cutting surface extending substantially parallel to one of said two opposed wall surfaces;
   rotary drive means including a rotatable, generally cylindrical driving wheel communicating with said channel and spaced longitudinally from said cutting means for engaging a portion of said cable and for drawing same through said channel upon rotation thereof, said driving wheel being rotatable about an axis disposed transversely to said channel and offset relative thereto; and
   means inclusive of a flat portion on said driving wheel extending axially therealong for establishing at said rotary drive means an access opening of measure not less than the approximate spacing of said channel wall surfaces, such access opening being established upon rotation of said driving wheel when said flat portion is periodically aligned substantially coplanarly with one of said wall surfaces of said channel, whereby said cable may be inserted laterally into said channel in a direction substantially parallel to said one cutting surface in interfering relation with said cutting means and in substantially non-interfering relation with said rotary drive means.

12. An apparatus according to claim 11, wherein said channel defines cable guide means preceding said cutting means.

13. An apparatus according to claim 12, wherein said channel further defines cable guide means succeeding said cutting means.

14. An apparatus according to claim 11, wherein said cutting means comprises a pair of blade members having cutting surfaces disposed in facing relation and defining a cable opening for receiving said cable therebetween, said cable opening being of dimension less than the thickness of said flat cable.

15. An apparatus according to claim 14, wherein portions of said blade members define a further opening of dimension greater than said cable opening and less than said cable thickness.

16. An apparatus according to claim 15, wherein said cutting surfaces include relatively sharp edges and wherein said blade member portions defining said opening include relatively blunt edges.

17. An apparatus according to claim 11, further including a knob fixedly coupled to said driving wheel and disposed exteriorly of said body for manual rotation thereof.

18. An apparatus according to claim 11, wherein said driving wheel includes a plurality of radially projecting teeth spaced about its circumference except at said flat portion, wherein upon rotation of said driving wheel said teeth periodically enter into said channel and extend into the spacing between the opposed wall surfaces of said channel.

19. An apparatus according to claim 18, further including detent means supported by said body for movably retaining said flat portion of said driving wheel in position substantially coplanarly with said channel wall surface.

* * * * *